United States Patent
Araki et al.

(10) Patent No.: US 7,629,874 B2
(45) Date of Patent: Dec. 8, 2009

(54) NEEDLE METER AND METHOD FOR MANUFACTURING THE SAME

(75) Inventors: Yoshinori Araki, Kariya (JP); Ryou Suzuki, Kariya (JP); Satoru Tamura, Anjo (JP)

(73) Assignee: Denso Corporation, Kariya (JP)

( * ) Notice: Subject to any disclaimer, the term of this patent is extended or adjusted under 35 U.S.C. 154(b) by 255 days.

(21) Appl. No.: 11/806,679

(22) Filed: Jun. 1, 2007

(65) Prior Publication Data
US 2007/0279243 A1 Dec. 6, 2007

(30) Foreign Application Priority Data

Jun. 6, 2006 (JP) .............................. 2006-157837
Apr. 25, 2007 (JP) .............................. 2007-116132

(51) Int. Cl.
*B60Q 1/00* (2006.01)

(52) U.S. Cl. ............................... 340/425.5; 340/995.15; 340/309.16

(58) Field of Classification Search .............. 340/425.5, 340/995.15, 995.17, 995.19, 309.16; 116/288, 116/300, 332, 286, 305
See application file for complete search history.

(56) References Cited

U.S. PATENT DOCUMENTS

| | | | | |
|---|---|---|---|---|
| 4,761,715 A | * | 8/1988 | Brooks | 362/23 |
| 4,984,459 A | * | 1/1991 | Shannon | 73/178 R |
| 5,982,168 A | * | 11/1999 | Westberg et al. | 324/160 |
| 7,123,135 B2 | * | 10/2006 | Kaneda | 340/438 |
| 7,159,534 B2 | * | 1/2007 | Tanaka et al. | 116/300 |
| 7,347,160 B2 | * | 3/2008 | Honma et al. | 116/288 |
| 2002/0174733 A1 | | 11/2002 | Rothermel | |
| 2006/0290486 A1 | | 12/2006 | Sumiya et al. | |

FOREIGN PATENT DOCUMENTS

| | | |
|---|---|---|
| DE | 4321146 | 1/1995 |
| JP | 11-108700 | 4/1999 |
| JP | 2005-106585 | 4/2005 |
| JP | 2005-227264 | 8/2005 |
| JP | 2006-098160 | 4/2006 |

OTHER PUBLICATIONS

German Office Action issued Mar. 28, 2008 issued in corresponding German Application No. 10-2007-025088.8 with English translation.

* cited by examiner

*Primary Examiner*—Daniel Previl
(74) *Attorney, Agent, or Firm*—Nixon & Vanderhye, PC

(57) ABSTRACT

A needle meter includes a display device, an indication arrangement, a needle, a first illumination member, a second illumination member, a circuit board, and a movement. The first illumination member illuminates the display device. The second illumination member illuminates the indication arrangement. The circuit board is provided at an opposite side of the display device opposite the reference face of the display device. The needle includes a hub portion, an arm portion, and a pointer portion such that the needle has a generally U-shape and is integrally molded of a translucent resin. The display device, the indication arrangement, the first illumination member, and the second illumination member are integrally received and supported by a bracket to constitute a display unit. The display unit is provided between the pointer portion and the arm portion of the needle in a direction for observing the reference face of the display device.

6 Claims, 6 Drawing Sheets

NEEDLE METER AND METHOD FOR MANUFACTURING THE SAME

CROSS REFERENCE TO RELATED APPLICATION

This application is based on and incorporates herein by reference Japanese Patent Application No.2006-157837 filed on Jun. 6, 2006 and Japanese Patent Application No. 2007-116132 filed on Apr. 25, 2007.

BACKGROUND OF THE INVENTION

1. Field of the Invention

The present invention relates to a needle meter, which indicates a magnitude of the measured amount by a rotation angle of the needle, and relates to a manufacturing method for manufacturing the same. For example, the present invention is applicable for a vehicle.

2. Description of Related Art

For example, a conventional needle meter is provided with a dial panel around a display unit, and with a movement for rotating a needle at a rear face side of the display unit. Also, the conventional needle meter is provided with a needle that turns around the display unit and the dial panel to extend over the dial panel from an outer peripheral side of the dial panel (see Japanese Patent Laid-Open No. 2005-106585 bulletin).

In this case, a central part of the needle meter (i.e., an area, which does not contribute to a display function of the meter) may be effectively utilized.

In the above-mentioned conventional needle meter, the needle is formed into a generally U-shape. For example, the U-shape of the needle includes longitudinal parts and a transverse part connecting the longitudinal parts at the ends thereof. One of the longitudinal parts of the U-shape of the needle serves as a pointer for directly indicating dial panel, and the other one of the longitudinal parts and the transverse part of the U-shape serve as a connecting member that connects a shaft of the movement and the pointer. In other words, the needle of the conventional needle meter includes the pointer and the connecting member, which are fixed to each other.

Because of this, it is difficult to sufficiently maintain the form accuracy of the needle, that is, accuracy of a physical relationship between the pointer and the connecting member. Also, there is disadvantage that an outward appearance of the fixed portion between the pointer and the connecting member deteriorates.

SUMMARY OF THE INVENTION

The present invention is made in view of the above disadvantages. Thus, it is an objective of the present invention to address at least one of the above disadvantages.

To achieve the objective of the present invention, there is provided a needle meter, which includes a display device, an indication arrangement, a needle, a first illumination member, a second illumination member, a circuit board, and a movement. The display device has a reference face. The indication arrangement is provided around the display device, and the indication arrangement has an indicator. The needle moves around the display device and points at the indication arrangement. The first illumination member illuminates the display device. The second illumination member illuminates the indication arrangement. The circuit board is provided at an opposite side of the display device opposite the reference face of the display device. The movement is mounted on the circuit board for rotating the needle. The needle includes a hub portion, an arm portion, and a pointer portion. The hub portion is fixed to a shaft of the movement. The arm portion extends from the hub portion toward an outer periphery of the indication arrangement. The pointer portion extends from an end portion of the arm portion along a surface of the indication arrangement toward an inner periphery of the indication arrangement such that the needle has a generally U-shape and is integrally molded of a translucent resin. The display device, the indication arrangement, the first illumination member, and the second illumination member are integrally received and supported by a bracket to constitute a display unit. The display unit is fixed to the circuit board through the bracket. The display unit is provided between the pointer portion and the arm portion of the needle in a direction for observing the reference face of the display device.

To achieve the objective of the present invention, there is also provided a method for manufacturing the needle meter. In the method, the needle is fixed to the movement mounted on the circuit board. Also, the display device, the indication arrangement, the first illumination member, and the second illumination member are assembled to the bracket to form the display unit. Then, the display unit is fixed to the circuit board after the fixing of the needle to the movement. In the fixing of the display unit, the needle is maintained at a predetermined angle position, and the display unit is inserted into a gap between the pointer portion and the arm portion from an opening end side of the needle, which has the generally U-shape, by displacing the display unit along a surface of the circuit board. Also, the display unit is fixed to the circuit board.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

A display device according to one embodiment of the present invention is described referring to the accompanying drawings with a case, where the display device is applied to a tachometer T mounted on an instrument panel 100 equipped with a vehicle.

Figure 1:
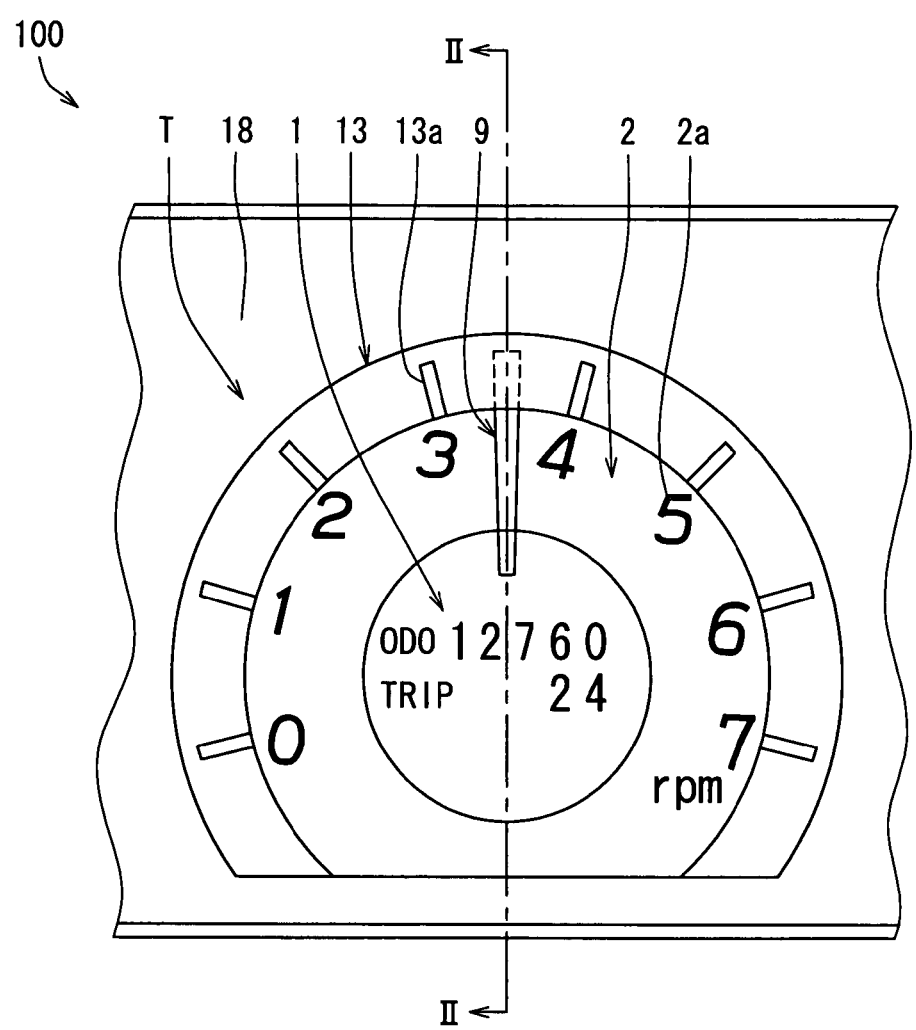
FIG. 1 is a front view of a tachometer according to one embodiment of the present invention.

The instrument panel 100 is arranged at a position front of a driver seat of a vehicle such that the instrument panel 100 is visible by a driver. The instrument panel 100 includes the tachometer T indicating a rotational speed of an engine of the vehicle as shown in FIG. 1, and also the instrument panel 100 further includes another meter and various indicators, all of which are not illustrated. The driver seat is provided on the left hand side of the instrument panel 100 in FIG. 2, and the instrument panel 100 is viewed (observed) by the driver from a left hand side in FIG. 2.

Figure 2:
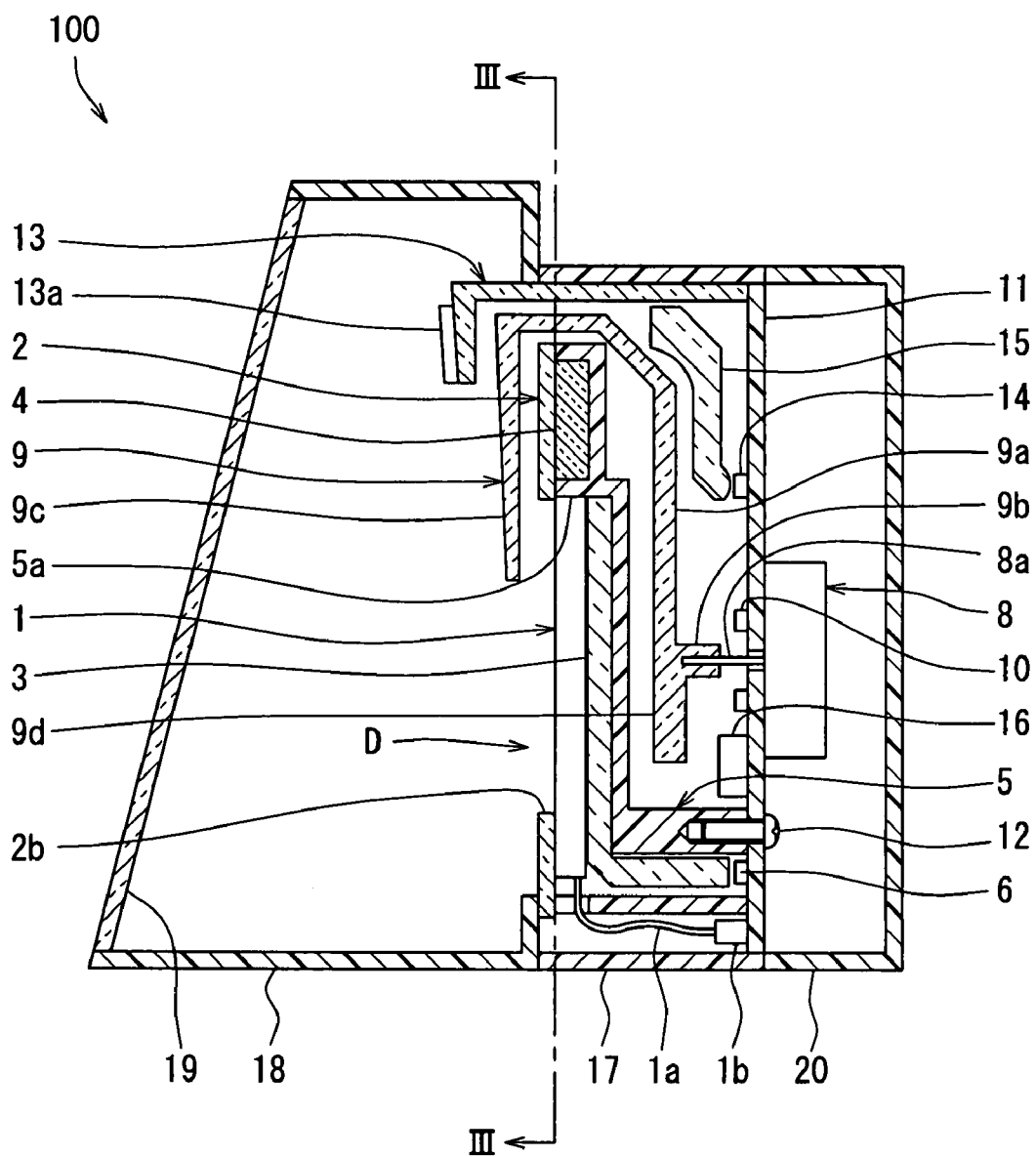
FIG. 2 is a cross-sectional view taken along line II-II in FIG. 1.

As shown in FIG. 2, a scale ring 13, a needle 9, a dial panel 2 and a liquid crystal display 1 are placed in this order at the tachometer T from a front side, that is, from a side toward the user of the instrument panel 100. For example, the front side is shown in a left in FIG. 2, and the rear side is shown in a right in FIG. 2. A structure of the tachometer T is described below.

The tachometer T includes the dial panel 2 (indication arrangement), the scale ring 13, and the needle 9 mainly. The dial panel 2 includes characters 2a (indicator). The scale ring 13 includes scale marks 3a. The needle 9 is rotated by a movement 8, and indicates the characters 2a and the scale marks 3a. In the central part of the dial panel 2, the liquid crystal display 1 serving as a display device is provided. As shown in FIG. 1, the liquid crystal display 1 has an odometer A indicating the accumulated mileage of the vehicle and a trip meter B indicating a section mileage. For example, the odometer and the trip meter are mounted on a reference surface of the liquid crystal display 1.

For example, the liquid crystal display 1, which is the display device, uses a dot matrix display and the like. Liquid crystal display 1 has a generally circular-shaped outer periphery. As shown in FIG. 2, a flexible circuit substrate 1a is connected with and extends from one end of the liquid crystal display 1. The flexible circuit substrate 1a functions as a lead wire that connects the liquid crystal display 1 with a control circuit.

A first light guide plate 3, which is a first illumination member, is provided at a rear face side of the liquid crystal display 1 (e.g., at an opposite side of the liquid crystal display 1 opposite the reference surface) to closely adhere to the liquid crystal display 1. The first light guide plate 3 is made from a translucency material, for example, a colorless clear polycarbonate resin or an acrylic resin, by molding. The first light guide plate 3 guides the light, which is emitted by a light emitting diode 6 serving as a first light source, to a rear face of liquid crystal display 1, and provides the liquid crystal display 1 with transmitted illumination. The first light guide plate 3 has a planar shape that corresponds (equivalent) to the liquid crystal display 1. Also, as shown in FIG. 2, the first light guide plate 3 has one end on a side toward the flexible circuit substrate 1a of liquid crystal display 1, and the one end is bent to form an L-shape cross section.

The dial panel 2 is provided around the liquid crystal display 1. The dial panel 2 is formed from a thin plate of a translucency material, for example, a colorless clear polycarbonate resin or the acrylic resin, to have a generally ring shape. The dial panel 2 is provided to overlap with a front face side of the liquid crystal display 1. Therefore, the liquid crystal display 1 is viewed through an opening 2b, which is a through hole located at a central portion of the dial panel 2.

The dial panel 2 includes the characters 2a, each of which serves as an indicator. The characters 2a are printed on a front face (left side face in FIG. 2) or a rear face (right side face in FIG. 2) of the dial panel 2, and alternatively, the characters 2a may be formed thereon by hot stamp. In other words, a part of the dial panel 2, except areas corresponding to the characters 2a, is provided with a non-translucency pigmented layer or a half translucency pigmented layer. Along with it, each character 2a is left transparent or it is provided with a half translucency pigmented layer. Therefore, the character 2a is luminously displayed when the dial panel 2 is provided with the transmitted illumination.

A second light guide plate 4, which is a second illumination member, is provided at a rear face side of the dial panel 2 to closely adhere to the dial panel 2. The second light guide plate 4 is made from a translucency material, for example, a colorless clear polycarbonate resin or an acrylic resin, by molding. The second light guide plate 4 guides the light, which is emitted by a light emitting diode 7 serving as a second light source, to a rear face of the dial panel 2, and the second light guide plate 4 provides the dial panel 2 with transmitted illumination. The planar shape of the second light guide plate 4 covers a region, where the characters 2a of the dial panel 2 are provided. At the same time, the planar shape of the second light guide plate 4 is formed into a generally C shape. Along with it, the ends of the C shape portion of the second light guide plate 4 bend to have an L-shaped cross section similar to the first light guide plate 3.

Figure 3:
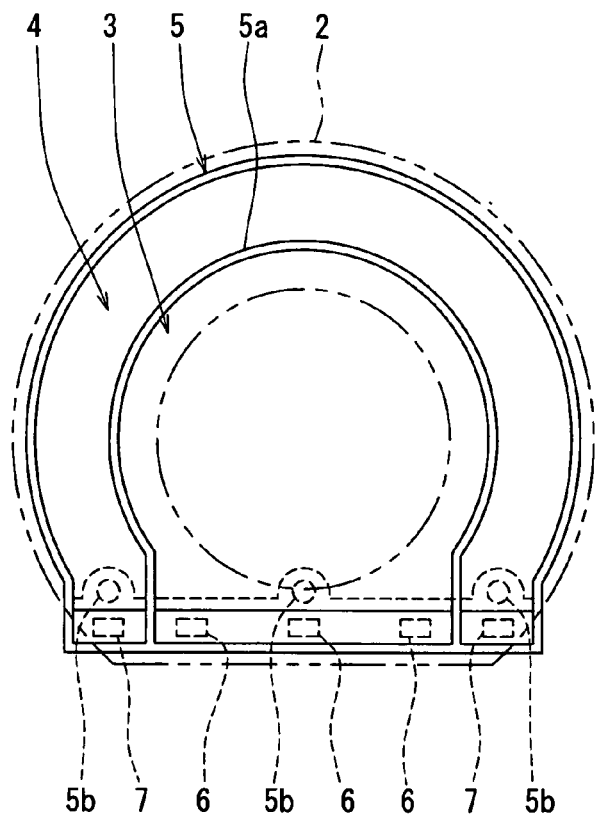
FIG. 3 is a cross sectional view taken along line III-III in FIG. 2.

The liquid crystal display 1, the dial panel 2, the first light guide plate 3, and the second light guide plate 4 are received and supported by a bracket 5 such that they are integrated with each other to constitute a display unit D. The bracket 5 is formed by molding of a resin material. As shown in FIG. 3, the second light guide plate 4 is provided at an outer peripheral side of the first light guide plate 3 in the bracket 5, and is generally coaxial to the first light guide plate 3. Note that the liquid crystal display 1 is omitted to clearly show a physical relationship of the first light guide plate 3 and the second light guide plate 4 in FIG. 3. A light baffle plate 5a is provided between the first light guide plate 3 and the second light guide plate 4 in the bracket 5. In this manner, the light baffle plate 5a limits outward appearances of the liquid crystal display 1 and the dial panel 2 from deteriorating. The outward appearances deteriorate because the light, which travels through one of the first light guide plate 3 and the second light guide plate 4, may be incident on the other one, and therefore rays for the transmitted illumination of the liquid crystal display 1 may mix with rays for the transmitted illumination of the dial panel 2. The light baffle plate 5a is formed to isolate the first light guide plate 3 from the second light guide plate 4 at the flat surface parts of the first light guide plate 3 and the second light guide plate 4. Also, the light baffle plate 5a is formed to isolate the first light guide plate 3 from the second light guide plate 4 at the L-shaped bent parts thereof. As shown in FIG. 2, the display unit D is fixed to a printed circuit board 11 by tightening the bracket 5 and the printed circuit board 11 with a screw 12.

For example, the printed circuit board 11 is formed of a glass epoxy substrate. Also, the printed circuit board 11 constitutes an electric circuit portion of the instrument panel 100 including the tachometer T. As shown in FIG. 2 and FIG. 3, the light emitting diode 6, which is the first light source, and the light emitting diode 7, which is the second light source, are mounted on the printed circuit board 11. The light emitting diode 6 is provided to face with an end portion of the L-shaped bent portion of the first light guide plate 3. The light emitting diode 7 is provided to face with an end portion of the L-shaped bent portion of the second light guide plate 4. The three light emitting diodes 6 are provided as shown in FIG. 3. Each of the light emitting diodes 7 is provided at a corresponding one of both ends of the C-shaped portion of the second light guide plate 4 as shown in FIG. 3. This enables that the whole areas of the liquid crystal display 1 and the dial panel 2 are lighted up with generally the same brightness. In a state, where the bracket 5 is fixed to the printed circuit board 11, outer peripheral sides of the light emitting diodes 6, 7 are covered with the bracket 5. Along with this, the light baffle plate 5a extends in the border of the light emitting diode 6 and the light emitting diode 7 such that the light baffle plate 5a reaches a surface of the printed circuit board 11. Thus, the light, which is emitted by the light emitting diode 6, is reliably limited from being incident on the second light guide plate 4. Also, the light, which is emitted by the light emitting diode 7, is reliably limited from being incident on the first light guide plate 3. Even more, the lights, which are emitted by both the light emitting diodes 6, 7, are reliably limited from leaking out of the bracket 5.

As shown in FIG. 2, the flexible circuit substrate 1a of the liquid crystal display 1 is connected to the printed circuit board 11 through a connector 1b.

As shown in FIG. 2, the movement 8 for rotating the needle 9 is mounted on the printed circuit board 11. The movement 8 includes an electrical actuator, such as a stepping motor or a cross coil-type rotator. A driving signal is applied to the movement 8 based on an electrical signal (e.g., a rotational speed signal of the engine for the tachometer T) from external, and the movement 8 rotates the shaft 8a. In the movement 8, the shaft 8a is provided correspondingly to a center of the dial panel 2. As shown in FIG. 2, the needle 9 is fixed to the end of shaft 8a of the movement 8.

The needle 9 is made from a translucency material, for example, a colorless clear polycarbonate resin or an acrylic resin, by molding. The needle 9 has a hub portion 9b, an arm portion 9a, and a pointer 9c (pointer portion) as shown in FIG. 2. The hub portion 9b is fixed to the shaft 8a of the movement 8. The arm portion 9a extends toward an outer periphery (e.g., in a radially outward direction) of the dial panel 2 from the hub portion 9b. The pointer 9c extends (projects) along a surface of the dial panel 2 toward an inner periphery of (e.g., in a radially inward direction) of the dial panel 2 from an end of the arm portion 9a. In other words, the needle 9 is formed by the arm portion 9a and the pointer 9c to make a form of generally U shape as shown in FIG. 2. Also, at the same time, the needle 9 is provided so that the display unit D is provided between the arm portion 9a and the pointer 9c. As shown in FIG. 2, the needle 9 has a counterweight 9d on an opposite side of the hub portion 9b opposite the arm portion 9a. The counterweight 9d lowers the magnitude of unbalanced moment applied to the needle 9 around the shaft 8a as much as possible, and therefore, the needle 9 is smoothly rotated. Note that in a case, where a weight made of a material of a large specific weight (e.g., a metallic material) is fixed to the counterweight 9d, the magnitude of the unbalanced moment applied to the needle 9 around the shaft 8a is lowered without increasing a physical size of the counterweight 9d.

The needle 9 is formed by integrally molding the hub portion 9b, the arm portion 9a, the pointer 9c, and the counterweight 9d.

The needle 9 is luminously displayed by the light, which is emitted by the light emitting diode 10. Here, the light emitting diode 10 is mounted on the printed circuit board 11 to face with a neighborhood portion of needle 9 neighborhood of the hub portion 9b of needle 9. In other words, the light that the light emitting diode 10 emits is incident into the needle 9 through the vicinity of the hub portion 9b. Then, the light reflects and travels inside the needle 9, and is emitted through the pointer 9c. This enables the above luminous display.

Here, the needle 9 of the generally U shape is provided to sandwich the display unit D from an outer peripheral side thereof, and rotates. Thus, a configuration of the display unit D (more specifically, of the bracket 5) is designed not to impede the rotation of the needle 9 at a normal rotation of the needle 9. In other words, the configuration of the display unit D is designed to be limited from interfering with the needle 9.

Because the whole needle 9 was formed by integral molding, it is possible to provide the tachometer T, in which the form accuracy of the needle 9 is improved and thereby the good outward appearance of the needle 9 is attained. For example, a shape of the coupling portion between the pointer 9c and the arm portion 9a is minimized in size. In other words, this removes the disadvantage in the needle of the conventional needle meter that the outward appearance of the coupling portion between the pointer and the connecting member deteriorates.

As shown in FIG. 2, the scale ring 13 is located on the outer peripheral side of the dial panel 2 and the outer peripheral side of the rotating range of the needle 9. The scale ring 13 is made from a translucency material, for example, a colorless clear polycarbonate resin or an acrylic resin, by molding. The scale ring 13 has a ring shape, a part of which is disconnected (e.g., the scale ring 13 has a generally C shape). Also, the scale ring 13 is located coaxially (concentrically) with the dial panel 2, that is, coaxially with the shaft 8a of the movement 8. As shown in FIG. 2, the scale ring 13 includes the scale marks 13a, each of which is formed as a projecting portion projecting in the front side (left side in FIG. 2) from the surface of the scale ring 13. A non-translucency pigmented layer is applied to a portion of the surface of the scale ring 13 except areas corresponding to the scale mark 13a through the printing or the hot stamp. Due to this, only the scale marks 13a are luminously displayed when the scale rings 13 are irradiated with the light via the light guide plate 15, which light is emitted by the light emitting diode 14 mounted on the printed circuit board 11.

The printed circuit board 11 is provided with a controller 16, which executes a control for operating the display of the liquid crystal display 1, a control for lighting/lighting-out of each light emitting diode 6, 7, 10, 14, and a control for operating the movement 8. For example, the controller 16 includes a microcomputer.

As shown in FIG. 2, the display unit D, the printed circuit board 11, the scale ring 13 are received and held in a casing 17 formed of a resin material.

As shown in FIG. 2, a generally frame-shaped face plate 18 is loaded at the front side of the scale ring 13. Further, a clear cover 19 is mounted at an end portion of the face plate 18. For example, the face plate 18 is formed of a resin material. The clear cover 19 is formed of a plate of a transparent resin or formed of glass. The face plate 18 and the clear cover 19 makes up the outward appearance of the instrument panel 100. At the same time, the face plate 18 and the clear cover 19 limits a dirt or moisture from entering into the instrument panel 100.

As shown in FIG. 2, in contrast, a lower cover 20 is mounted behind the casing 17 (e.g., the lower cover 20 is mounted on an opposite side of the casing 17 oppose the clear cover 19). For example, the lower cover 20 is formed from a resin material.

Figure 4:
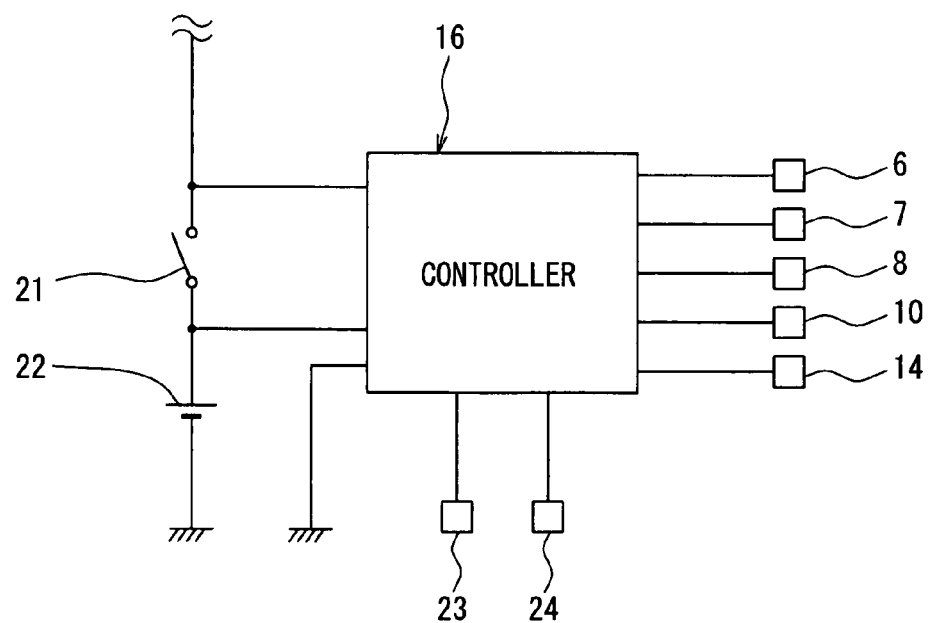
FIG. 4 is a schematic block diagram to explain an electrical circuitry of the tachometer according to the one embodiment of the present invention.

Next, an electrical circuitry and an operation of the above tachometer T according to the one embodiment of the present invention is explained referring to FIG. 4.

As shown in an electric circuit schematic drawing of FIG. 4, electric power is always supplied from a battery 22 to the controller 16. Also, the controller 16 is connected to an ignition switch 21 so that an operational state (ON or OFF) of the ignition switch 21 is detected.

The controller 16 is connected to the liquid crystal display 1, the movement 8, and the light emitting diodes 6, 7, 10, 14, all of which are the control targets of the controller 16. Further still, a rotation sensor 23 detecting engine speed of the vehicle and a travel sensor 24 detecting mileage of the vehicle are connected to the controller 16 so that the detection signals are inputted to the controller 16. For example, a sensor detecting rotational speed of a propeller shaft (i.e., an output shaft of the gearbox) is used as the travel sensor 24. Here, the propeller shaft is not shown. In this case, the mileage the vehicle is calculated based on the rotational speed of the propeller shaft, a gear reduction ratio (known) of the differential gear, and the tire diameter (known) of the driven wheel.

(1) A case, where the ignition switch 21 is turned on, is described.

When the ignition switch 21 is turned on by the driver (user), the controller 16 detects it, and starts display control operation of the tachometer T.

The controller 16 illuminates the light emitting diodes 6, 7, 10, 14. Due to this, each character 2a of the dial panel 2 is lighted up, and is luminously displayed by the light from the light emitting diode 7. Also, each scale mark 3a of the scale ring 13 is lighted up and is luminously displayed by the light from the light emitting diode 14. Further still, the needle 9 is lighted up and is luminously displayed by the light from the light emitting diode 10. At the same time, the liquid crystal display 1 is provided with the transmitted illumination by the light from the light emitting diode 6, and therefore, the liquid crystal display 1 becomes effectively viewed (observed).

Successively, the controller 16 drives the movement 8 based on the detection signal from the rotation sensor 23 such that the shaft 8a is pivoted to a predetermined angle, that is, an angle corresponding to the engine speed of the vehicle. Thus, in the tachometer T part, the needle 9 (more specifically the pointer 9c) indicates a character 2a in the dial panel 2 and a scale mark 3a of the scale ring 13 such that the engine speed is indicated.

The controller 16 calculates the mileage of the vehicle based on the signal from the travel sensor 24 successively. Also, the controller 16 operates the liquid crystal display 1 such that the liquid crystal display 1 indicates in its screen the mileage of the vehicle, that is the accumulated mileage (ODO) and the interval mileage (TRIP) of the vehicle as shown in FIG. 1.

(2) A case, where the ignition switch 21 is turned off, is described.

When the ignition switch 21 is turned off by the user, the controller 16 detects it, and turns off the light emitting diodes 6, 7, 10, 14. Also, the controller 16 stops operating the movement 8 and the liquid crystal display 1.

Next, a manufacturing method for manufacturing the tachometer T according to the one embodiment of the present invention is described below. Mainly, an assembly method for fixing the display unit D to the printed circuit board 11 is explained.

By this event, each light emitting diode 6, 7, 10, 14, the movement 8, and the controller 16 have been mounted on the printed circuit board 11.

At first, the hub portion 9b of the needle 9 is fixed to the shaft 8a of the movement 8 on the printed circuit board 11 to perform a needle mounting step.

Next, a display unit formation step for manufacturing the display unit D is performed. In other words, the first light guide plate 3, the second light guide plate 4, the liquid crystal display 1, and the dial panel 2 are attached to and fixed to the bracket 5. At first, the first light guide plate 3 and the second light guide plate 4 are installed in the bracket 5. Next, the liquid crystal display 1 is attached on the first light guide plate 3 to overlap with the first light guide plate 3. At last, the dial panel 2 is attached on the second light guide plate 4 to overlap with the second light guide plate 4.

Note that the needle mounting step may be replaced with the display unit formation step described above in its order. Also, both steps may be simultaneously carried out. Here, for example, the liquid crystal display 1, the dial panel 2, the first light guide plate 3, and the second light guide plate 4 are handled as a single display unit such that the operability in the needle mounting step is facilitated.

Next, the display unit mounting step for fixing the display unit D to the printed circuit board 11, to which the needle mounting step has been performed, is performed.

At first, a needle adjustment step for maintaining an angular position of the needle 9 at a predetermined angular position is performed. Here, the predetermined angular position is a position, at which a connecting portion between the arm portion 9a and the pointer 9c of the needle 9 is located at an opposite side of the shaft 8a opposite a fixing position of the display unit D on the printed circuit board 11 (i.e., the mounting position of the screw 12). In other words, the predetermined angular position is a position, at which an open end of the U-shaped needle 9 is positioned to face toward a mounting position of the screw 12 on the printed circuit board 11, and in other words, the predetermined angular position is an angular position as shown in FIG. 2. For example, in order to perform this operation, the printed circuit board 11 may be connected to an electric circuit arrangement for an assembly operation, and the movement 8 is driven by this electric circuit arrangement.

The insertion step for inserting the display unit D into a gap between the arm portion 9a and the pointer 9c from the open end side of the U-shaped portion of the needle 9 by displaying the display unit D along the face of printed circuit board 11 is performed.

Lastly, the screw 12 is tightened into a mount hole 5b of the bracket 5 via the printed circuit board 11. By this, the bracket 5 is fixed to the printed circuit board 11, and the connector 1b of the liquid crystal display 1 is connected to the printed circuit board 11. Therefore, the assembly of the display unit D to the printed circuit board 11 is completed. Next, this printed circuit board 11 is assembled to the casing 17, and the face plate 18 and the clear cover 19 are attached to the casing 17. Lastly, the lower cover 20 is provided to cover the rear face side of the printed circuit board 11 and the lower cover 20 is attached to the casing 17.

In the above tachometer T according to the one embodiment of the present invention, the generally U-shaped needle 9 is formed by integral molding from a translucent resin.

This makes it possible to provide the tachometer T, in which the form accuracy of the needle 9 is improved, and therefore the good outward appearance of the needle 9 is attained. In other words, this removes the disadvantage in the needle of conventional needle meter that the outward appearance of the coupling portion (connecting portion) between the pointer and the connecting member deteriorates.

A structure and an assembling method for assembling the tachometer T according to a modification of the one embodiment of the present invention is described referring to FIGS. 5 to 8. Note that, in FIGS. 5 to 8, similar components similar to those of the tachometer T of the one embodiment of the present invention are indicated by the same numerals.

A structure of a first light guide plate 3, which is the first illumination member lighting up the liquid crystal display 1, and a general configuration of a tachometer T in this modification differ from the tachometer T in the one embodiment of the present invention. The basic structure of the tachometer T in this modification except the above is identical to the tachometer T in the one embodiment of the present invention.

Figure 5:
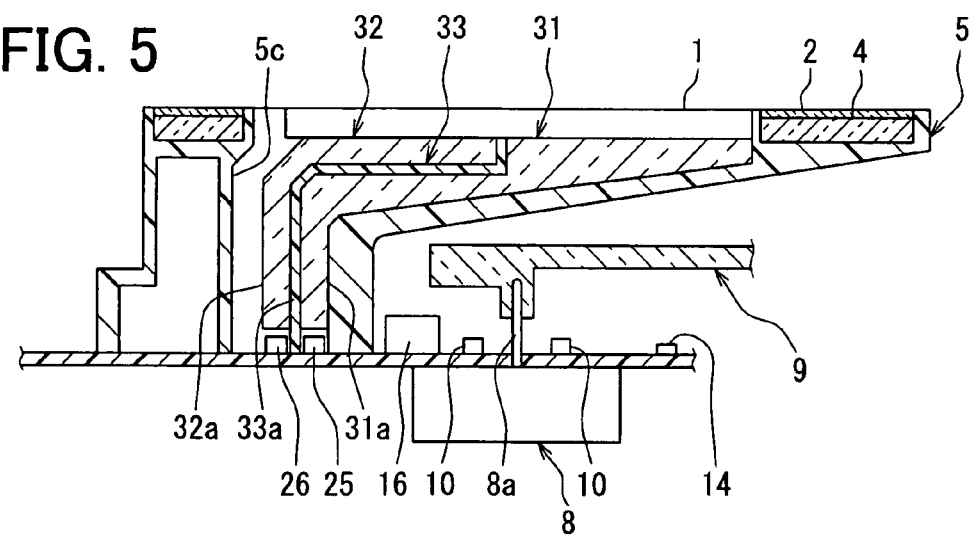
FIG. 5 is a partial sectional view of a tachometer according to a modification of the one embodiment of the present invention, and corresponds to the cross sectional view taken along line II-II in FIG. 1.

The first light guide plate 3 of the tachometer T in the modification includes a first light guide plate 31 and a first light guide plate 32. The first light guide plate 31 lights up one of the two divided regions of the liquid crystal display 1. The first light guide plate 32 lights up the other one of the two divided regions of the liquid crystal display 1. The first light guide plate 31 and the first light guide plate 32 are provided such that a part of the first light guide plate 31 overlaps (faces) with the first light guide plate 32 in a direction for viewing (observing), in other words, generally in an axial direction of the shaft 8a of the movement 8, as shown in FIG. 5. And, as shown in FIG. 5, a light baffle plate 33 is provided between the first light guide plate 31 and the first light guide plate 32. The light baffle plate 33 is made of a resin thin plate having a light blocking effect or of a sheet metal. The light baffle plate 33 limits the light emitted by the first light guide plate 32 from lighting up (illuminating) the liquid crystal display 1 via the first light guide plate 31. Thus, two light emitting diodes (i.e., a light emitting diode 25 and a light emitting diode 26) are installed to serve as the first light source correspondingly to a structure, where the first light guide plate, which is the illumination member lighting up the liquid crystal display 1, includes the two light guide plates (i.e., the first light guide plate 31 and the first light guide plate 32). For example, the light emitting diode 25 emits light incident on the first light guide plate 31. The light emitting diode 26 emits light incident on the first light guide plate 32. In other words, as shown in FIG. 5, the light emitting diode 25 is mounted on the printed circuit board 11 opposed to the first light guide plate 31. The light emitting diode 26 is mounted on the printed circuit board 11 opposed to the first light guide plate 32.

About an assembly method for assembling the tachometer T in the modification of the one embodiment of the present invention, the following methods are explained below. These methods include a method for assembling the display unit D, a method for assembling the printed circuit board 11 to the casing 17 and for placing the needle 9, and a total assembly method.

Figure 6:
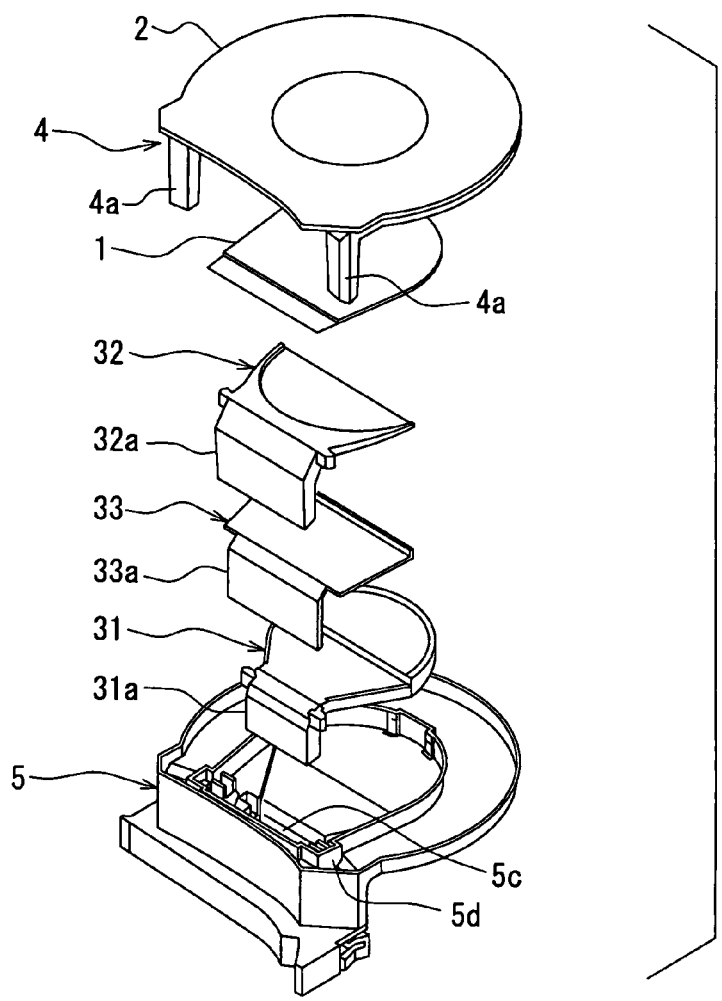
FIG. 6 is an exploded perspective view of a display unit of the tachometer according to the modification of the one embodiment of the present invention.

Firstly, the assembly method of the display unit D is explained referring to FIG. 6. Note that, before the below-described assembly step of the display unit D, the dial panel 2 has been mounted to the second light guide plate 4, and therefore the dial panel 2 and the second light guide plate 4 are integral with each other.

The first light guide plate 31, the light baffle plate 33, the first light guide plate 32, the liquid crystal display 1, the second light guide plate 4, and the dial panel 2 are attached and fixed to the bracket 5 such that the display unit D is formed. A guide portion 31a of the first light guide plate 31, a guide portion 33a of the light baffle plate 33 and a guide portion 32a of the first light guide plate 32 are inserted into and fixed to a guide hole 5c of the bracket 5 in a direction from the upper part to the lower part in FIG. 6. Then, the liquid crystal display 1 is provided to overlap with the first light guide plate 31 and the first light guide plate 32 in a direction from the upper part to the lower part in FIG. 6, and is fixed. Then, guide portions 4a of the second light guide plate 4, on which the dial panel 2 has been mounted, are inserted into guide holes 5d of the bracket 5 from the upper part in FIG. 6, and fixed. Likewise, the assembly of the display unit D is completed.

Figure 7:
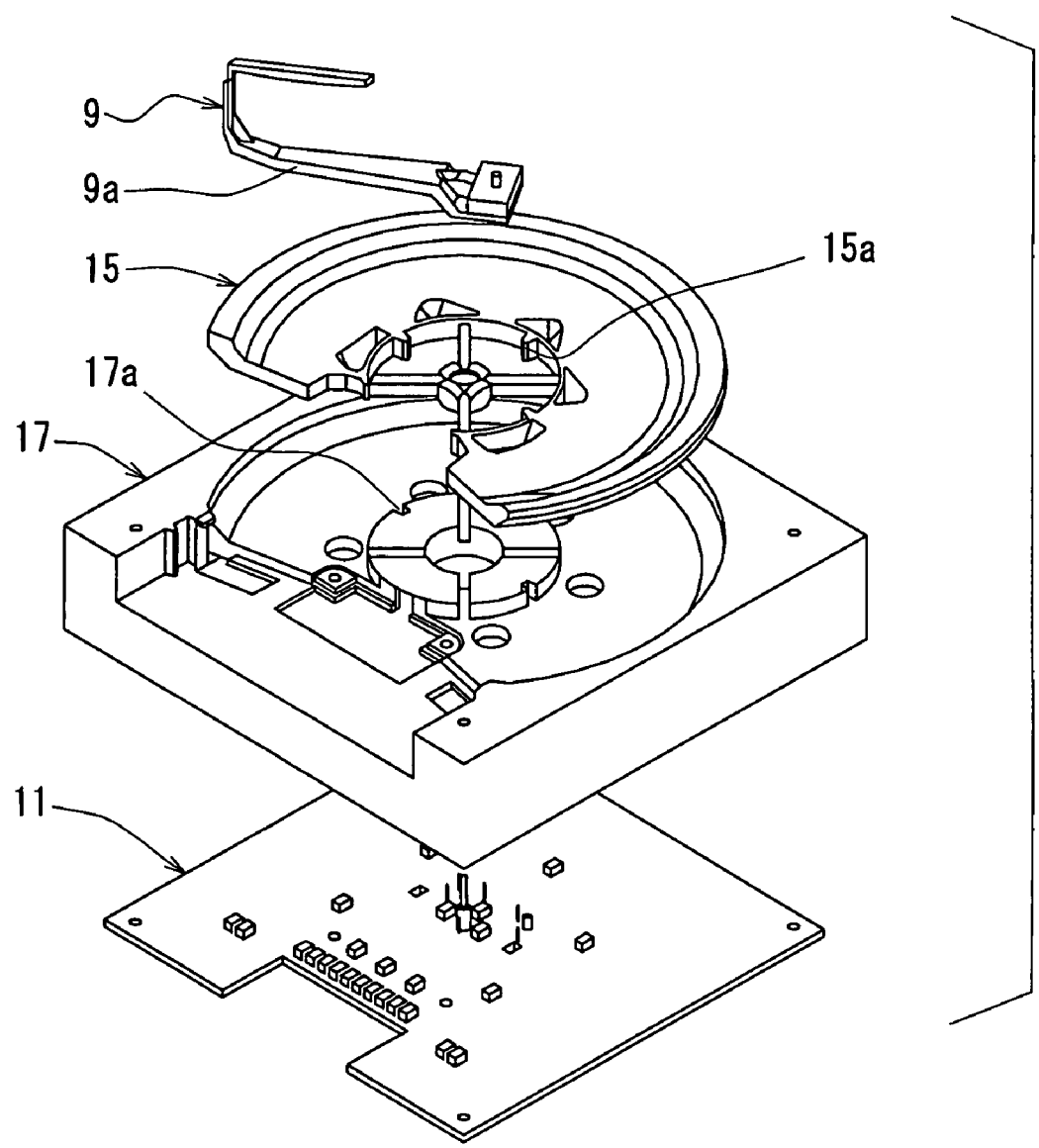
FIG. 7 is an exploded perspective view of a casing of the tachometer according to the modification of the one embodiment of the present invention.

Next, a method for assembling the printed circuit board on the casing 17 and for placing the needle 9 is explained referring to FIG. 7. Note that before steps for assembling the printed circuit board on the casing 17 and for placing the needle 9, electrical parts, such as the movement 8, the light emitting diodes 7, 10, 14, 25, 27, and the controller 16, have been mounted to the printed circuit board 11.

At first, the printed circuit board 11 is inserted into the casing 17 from a rear face side of the casing 17, and fixed thereto. The rear face side of the casing 17 is an opposite side of the casing 17 opposite the driver (user). Here, the rear face side of the casing 17 is a lower side in FIG. 7. Then, from the front side of casing 17 (i.e., an upper side in FIG. 7), the light guide plate 15 for illuminating the scale ring 13 is inserted into the casing 17, and is fixed thereto. At this time, a projection 15a of a light guide plate 15 is engaged with a guide groove 17a of the casing 17. Due to this, the light guide plate 15 is precisely supported relative to the casing 17 with a predetermined physical relationship (e.g., predetermined relative arrangement). Then, the needle 9 is press-fitted with the shaft 8a of the movement 8, and is fixed thereto. The step for fixing the needle 9 is explained. At first, the movement 8 is driven by a dedicated electric apparatus (e.g., electric circuit arrangement) such that a rotation angle position of the shaft 8a is set at a predetermined angular position. Next, a relative position of the needle 9 relative to the casing 17 (in other words, the angular position of the arm portion 9a of the needle 9 relative to the casing 17) is set at a predetermined angle. At the same time, the hub portion 9b of the needle 9 is press-fitted with the shaft 8a. Here, the angular positioning of the arm portion 9a of the needle 9 relative to the casing 17 is performed by a visual inspection so that, for example, a pointing portion provided on the casing 17 and the arm portion 9a of the needle 9 are overlapped with (faced with) each other in the axial direction of the shaft 8a. For example, the above-mentioned pointing portion is formed at the casing 17 as a projection or a hole. As above, the assembly of the printed circuit board 11 to the casing 17 and the placing of the needle 9 are completed.

Figure 8:
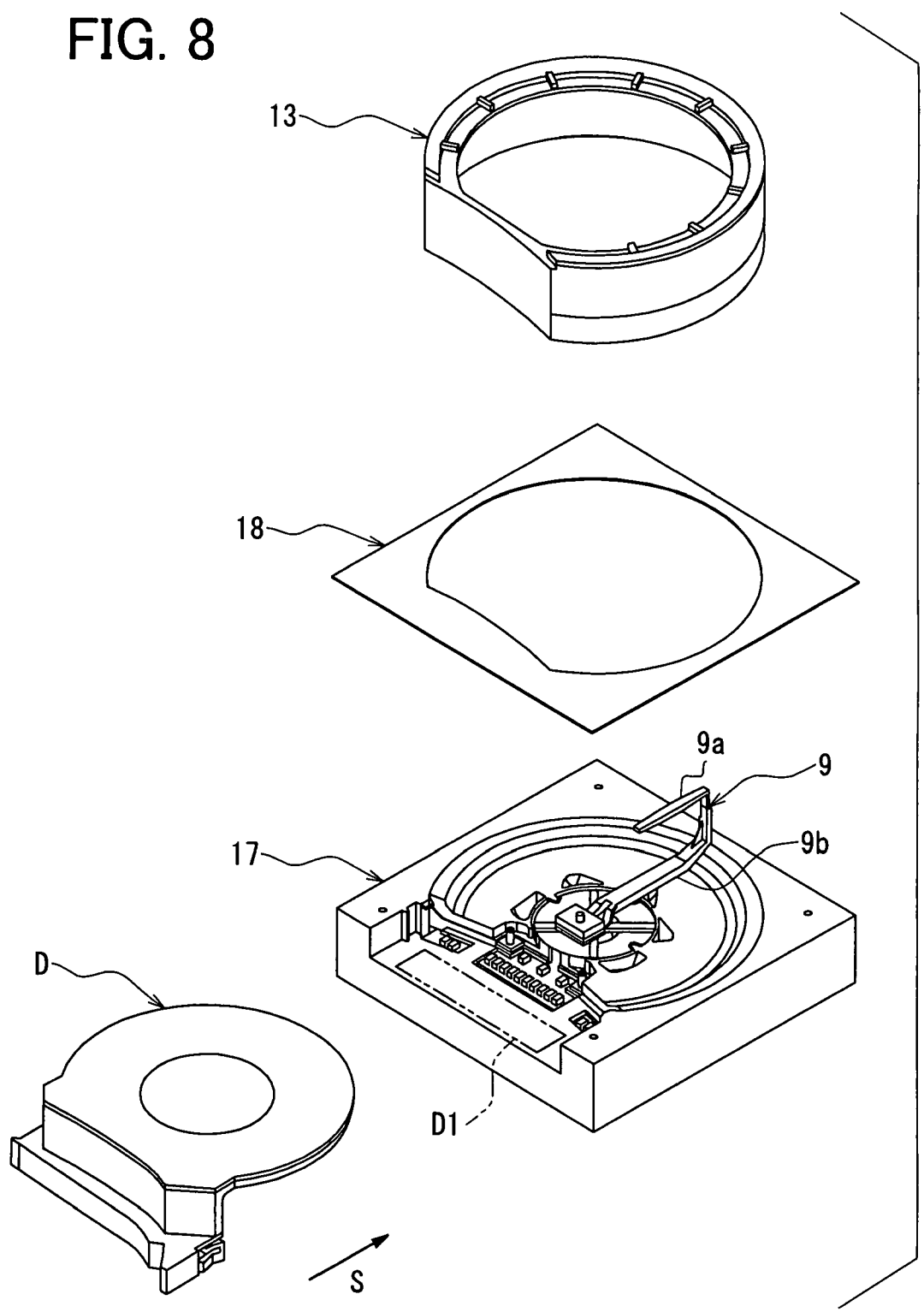
FIG. 8 is an exploded perspective view of the tachometer according to the modification of the one embodiment of the present invention.

Lastly, the total assembly method of the tachometer T is explained referring to FIG. 8.

At first, an angular position of needle 9 is set as shown in FIG. 8 at the predetermined angular position, which allows the display unit D to be attached to the casing 17. Here, the predetermined angular position is a position, at which a connecting portion between the arm portion 9a and the pointer 9c of the needle 9 is located at an opposite side of the shaft 8a opposite a fixing position of the display unit D on the casing 17 (i.e., a part shown by a two-dot chain line D1 in FIG. 8). In other words, the predetermined angular position is a position, at which an open end of the U-shaped needle 9 is positioned to face toward the fixing position of the display unit D on the casing 17. For example, the printed circuit board 11 is connected to an electric circuit arrangement for the assembly operation such that the movement 8 is driven by this electric circuit arrangement to perform the angular positioning of this needle 9.

Next, the display unit D is inserted into a gap between the arm portion 9a and the pointer 9c from the open end side of the U-shaped portion of the needle 9 by displaying the display unit D along the face of printed circuit board 11 (i.e., in a direction indicated as an arrow in FIG. 7). Then, the liquid crystal display 1 is electrically connected to the printed circuit board 11.

The face plate 18 and the scale ring 13 are fixed on the front face of the casing 17 from the upper part in FIG. 7. Likewise, the assembly of the display unit D with the printed circuit board 11 (i.e., the casing 17) is completed.

In each of the above embodiments of the present invention, the first light source and the second light source are mounted on the printed circuit board 11 such that the display unit D includes only one electric device, that is, the display device (the liquid crystal display 1). Thus, when the display unit D is fixed to the printed circuit board 11, an electrical connection between the display unite D and the circuit board is dedicated to the display device. Thus, electrical connection means (e.g., a flexible printed circuit) for electrically connecting between the display unite D and the circuit board is effectively minimized, and the operability in the needle mounting step is effectively facilitated.

In each of the above embodiments of the present invention, the liquid crystal display 1 serves as the display device. Thus, the flexibility of selecting designs displayed in the screen is substantially high, and multiple sets of information are simultaneously or by turns displayed. Thus, it is possible to provide the needle meter that has a better visibility (easier-to-see) and an original (new) outward appearance while the area for the display is effectively used.

In each of the above embodiments, the display design of the needle meter corresponds to the outer shape of the display device, and thereby the display designs are unified for providing better design and an original (new) outward appearance.

In each of the above embodiments, the outer peripheral shape is formed into a circular shape. Thus, the display designs of the needle meter and of the display device are further more unified for providing further better design and a better original (new) outward appearance.

Note that, in the above tachometer T in the one embodiment of the present invention, the light emitting diode 6 is used as a light source for a backlight of the liquid crystal display 1. Also, the light emitting diode 7 is used as a light source for illuminating the characters 2a. Also, the light emitting diode 14 is used as a light source for illuminating the scale marks 3a. Also, the light emitting diode 10 is used as a light source for illuminating the needle 9. However, at least one of these light emitting diodes may be replaced with a different kind light source (e.g., an electric lamp, a discharge tube, an electroluminescent panel).

Also, the needle meter is described as the tachometer T in the explanation of the one embodiment of the present invention. However, the present invention may be applied to another needle meter (e.g., a speedometer indicating a travel speed or a fuel gauge displaying a quantity of remained fuel). Also, in the tachometer T of the one embodiment of the present invention, which is explained above, the liquid crystal display 1 has the odometer A and the trip meter B. However, it is not necessary to limit to these gage, and different gages or various alarm displays may be formed on the liquid crystal display 1.

Also, the liquid crystal display 1 is used as the display device in the above tachometer T of the one embodiment of the present invention. However, a different display device (e.g., a fluorescent display) may be alternatively used.

Additional advantages and modifications will readily occur to those skilled in the art. The invention in its broader terms is therefore not limited to the specific details, representative apparatus, and illustrative examples shown and described.

What is claimed is:

1. A needle meter comprising:
a display device having a reference face;
an indication arrangement provided around the display device, the indication arrangement having an indicator;
a needle;
a first illumination member for illuminating the display device;
a second illumination member for illuminating the indication arrangement;
a circuit board provided at an opposite side of the display device with respect to the reference face of the display device; and
a movement mounted on the circuit board for rotating the needle around the display device while pointing at the indication arrangement, wherein:
the needle includes;
a hub portion fixed to a shaft of the movement;
an arm portion extending from the hub portion toward an outer periphery of the indication arrangement; and
a pointer portion extending from an end portion of the arm portion along a surface of the indication arrangement toward an inner periphery of the indication arrangement whereby the needle has a generally U-shape with the indication arrangement disposed between the pointer portion and the arm portion of the needle and wherein the U-shaped needle is integrally molded of a translucent resin;
the display device, the indication arrangement, the first illumination member, and the second illumination member are integrally received and supported by a bracket to constitute a display unit;
the display unit is fixed to the circuit board through the bracket; and
the bracket is provided between the pointer portion and the arm portion of the needle in a direction for observing the reference face of the display device.

2. The needle meter according to claim 1, further comprising:
a first light source mounted on the circuit board for emitting light; and
a second light source mounted on the circuit board for emitting light, wherein:
the first illumination member is a first light guide plate for guiding light emitted by the first light source to the opposite side of the display device; and
the second illumination member is a second light guide plate for guiding light emitted by the second light source to an opposite side of the indication arrangement with respect to the surface of the indication arrangement along which surface the pointer portion extends.

3. The needle meter according to claim 2, wherein:
the bracket includes a light baffle provided between the first light guide plate and the second light guide plate.

4. The needle meter according to claim 1, wherein:
the display device is a liquid crystal display.

5. The needle meter according to claim 1, wherein the direction for observing the reference face of the display device is generally parallel to an axial direction of the shaft of the movement.

6. A method for manufacturing a needle meter including a display device having a reference face; an indication arrangement provided around the display device, the indication arrangement having an indicator; a needle; a first illumination member for illuminating the display device; a second illumination member for illuminating the indication arrangement; a circuit board provided at an opposite side of the display device with respect to the reference face of the display device; and a movement mounted on the circuit board for rotating the needle around the display device while pointing at the indication arrangement, wherein: the needle includes: a hub portion fixed to a shaft of the movement; an arm portion extending from the hub portion toward an outer periphery of the indication arrangement; and a pointer portion extending from an end portion of the arm portion along a surface of the indication arrangement toward an inner periphery of the indication arrangement whereby the needle has a generally U-shape with the indication arrangement disposed between the pointer portion and the arm portion of the needle and wherein the U-shape needle is integrally molded of a translucent resin; the display device, the indication arrangement, the first illumination member, and the second illumination member are integrally received and supported by a bracket to constitute a display unit; the display unit is fixed to the circuit board through the bracket; and the bracket is provided between the pointer portion and the arm portion of the needle in a direction for observing the reference face of the display device, the method comprising:

fixing the needle to the movement mounted on the circuit board;

assembling the display device, the indication arrangement, the first illumination member, and the second illumination member to the bracket to form the display unit; and fixing the display unit to the circuit board after fixing the needle to the movement, wherein:

said fixing the display unit includes:

maintaining the needle at a predetermined angle position;

inserting the display unit into a gap between the pointer portion and the arm portion from an opening end side of the generally U-shaped needle, by displacing the display unit along a surface of the circuit board; and fixing the display unit to the circuit board.

\* \* \* \* \*